No. 887,275. PATENTED MAY 12, 1908.
J. RUMPEL.
WEED CUTTING AND ROOT DESTROYING DEVICE.
APPLICATION FILED OCT. 28, 1907.
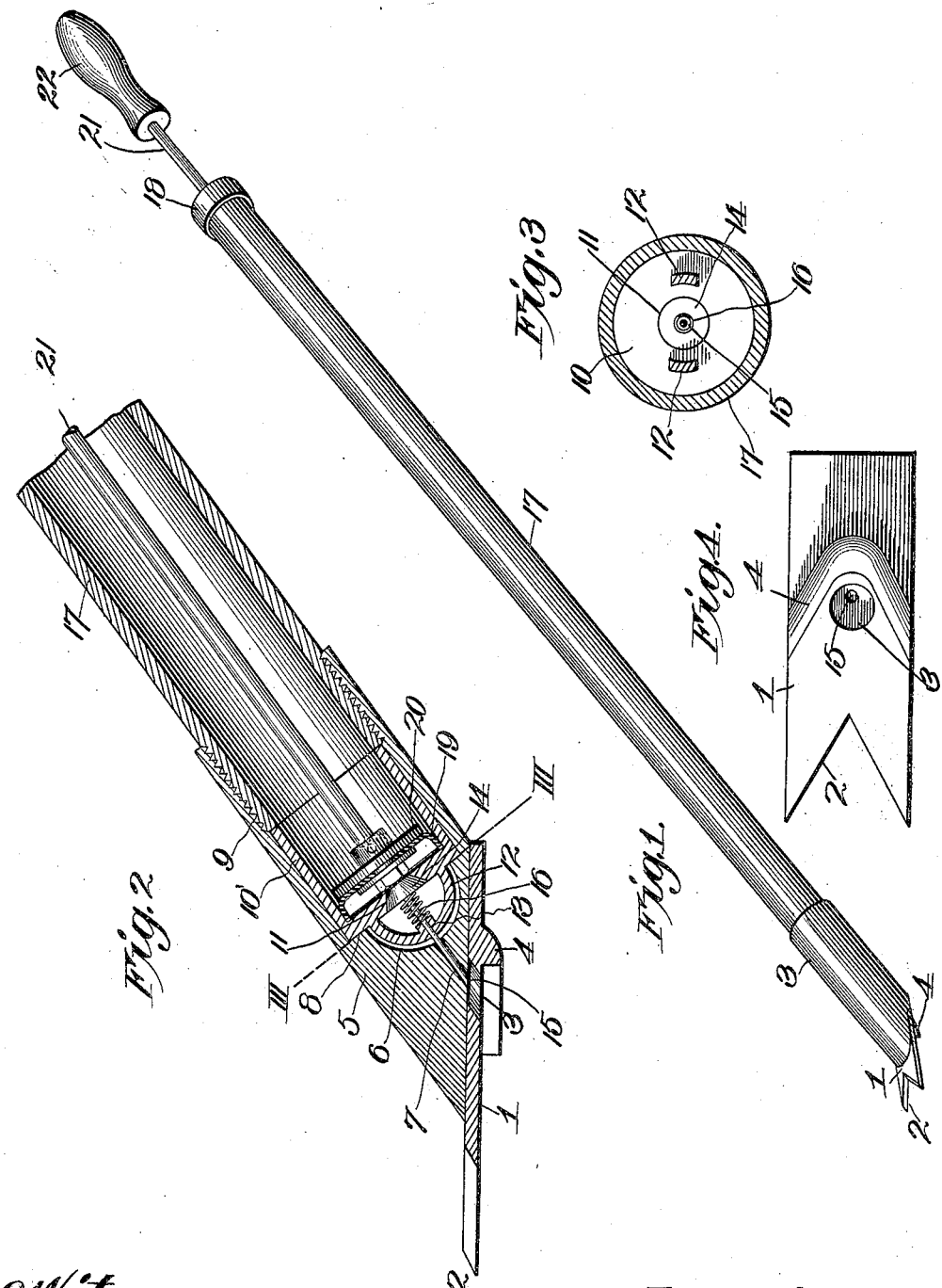

UNITED STATES PATENT OFFICE.

JULIUS RUMPEL, OF WESTON, MISSOURI.

WEED-CUTTING AND ROOT-DESTROYING DEVICE.

No. 887,275.

Specification of Letters Patent.

Patented May 12, 1908.

Application filed October 28, 1907. Serial No. 399,589.

*To all whom it may concern:*

Be it known that I, JULIUS RUMPEL, a citizen of the United States, residing at Weston, in the county of Platte and State of Missouri, have invented certain new and useful Improvements in Weed-Cutting and Root-Destroying Devices, of which the following is a specification.

This invention relates to weed cutting and root destroying devices and my object is to produce a simple, strong, durable and inexpensive device of this character whereby one can easily and quickly cut down weeds at or just below the ground level and then without moving the device, discharge a chemical substance onto the root where severed for the purpose of killing the same.

A further object is to produce a device of this character having a valve to be automatically unseated for the discharge of the chemical substance and provided with a stem whereby the discharge passage shall be kept free and open for the exit of such substance.

With these objects in view and others as hereinafter appear, the invention consists in certain novel and peculiar features of construction and organization as hereinafter described and claimed; and in order that it may be fully understood reference is to be had to the accompanying drawing, in which Figure 1, is a perspective view of a device embodying my invention. Fig. 2, is an enlarged central vertical section of a part of the device. Fig. 3, is a cross section on the line III—III of Fig. 2. Fig. 4, is an inverted plan view of the blade of the device.

In the said drawings, 1 indicates a cutting blade having a cutting edge 2, preferably V-shape as shown so as to more effectually cut the roots of weeds against which the blade is forced at the surface of the ground or slightly below the same at the option of the operator.

3 is an opening in the blade and 4 a depending shoulder or stop to strike the upper end of the root after the weed is severed and arrest the blade with the opening 3 at the top of the root, the shoulder or stop 4 being preferably V-shaped so as to insure the disposition of the opening 3 at the top of the root.

5 indicates a cylindrical casting having its bottom flat and extending at an angle to its longitudinal center and secured with said flat end or bottom to and upon the blade. This casting is provided with a socket 6 connected by a small passage 7 to opening 3 of the blade. The socket at a suitable point above its bottom is diametrically enlarged so as to provide the upwardly disposed shoulder 8 and at a suitable distance above said shoulder the casting is internally threaded as at 9.

10 is a cup fitting in the socket and resting on shoulder 8 and provided with a central upwardly tapering valve seat 11, and with a depending semicircular perforated cross bar 12 having a central perforation 13.

14 indicates a valve normally seated in valve seat opening 11, and having its stem 15 extending downward through the perforation 13 and passage 7 and of smaller diameter than the latter, the valve being held normally to its seat by the spring 16 surrounding the stem and bearing at its opposite ends against the valve and bar 12.

17 indicates a tube externally threaded at its lower end extending into the socket and engaging threads 9 thereof, and engaging the upper end of the valve cup to hold the same in position, the upper end of the tube being closed by a screw cap 18. A piston of any suitable type is arranged to reciprocate in the tube and cup, the one shown consisting of the usual inverted cup-shaped washer 19 backed up by a disk 20 and secured with the latter on the lower end of the plunger stem 21 extending up through the cap 18 and provided at its upper end with a handle 22. The device as a whole is of sufficient length to extend about waist high, so that the operator can manipulate it without bending materially and therefore with but little exertion.

In the operation of the tool the front end of the blade is brought to bear against the root of the weed to be destroyed with the blade resting upon or pushed slightly into the ground. The device is then pushed sharply forward so that the cutting edge will sever the root at about the point mentioned, the push by preference being sufficiently extended to bring the stop or shoulder against that portion of the root remaining in the ground, it being obvious that if the device is not pushed forwardly in a perfectly straight line, the converging walls of the slot will cause it to shift laterally slightly so that the blade will eventually be arrested with the hole 3 directly over the cut surface of the root. The operator then—assuming that the tube has been charged with a suitable chemical solution for killing the root—manipulates the plunger or piston by reciprocating the handle so as to discharge a quantity of such solution onto the exposed upper end of the root, it being understood that when the plunger is pulled upward its washer 11 collapses to permit the solution to pass below it and that when it is forced downward it expands and imposes pressure on the liquid which results in the unseating of the valve and the discharge of the liquid through the valve opening and thence through the passage 7 and opening 3.

From the above description it will be apparent that I have produced a device of the character described which embodies the features of advantage enumerated as desirable and I wish it to be understood that I do not wish to be restricted to the exact details of construction shown and described as obvious modifications will suggest themselves to one skilled in the art.

Having thus described the invention what I claim as new and desire to secure by Letters Patent, is:—

1. In a device of the character described, a blade having a sharpened front end and an opening rearward of such end, a casting rigid with the blade and projecting upwardly therefrom and provided with a passage communicating with said opening, a cup for the casting provided with a valve opening and an apertured bar below the same, a valve in said opening provided with a stem extending slidingly through the apertured bar, a spring bearing against said valve to hold it seated in the said valve opening, a tube secured in the casting above the cup and a piston arranged to be reciprocated in the tube and cup for the purpose set forth.

2. A device of the character described, consisting of a cutting blade having a sharpened front end, an opening and a depending shoulder rearward of said opening, a casting rigid with the blade and projecting upwardly and rearwardly therefrom and provided with a passage communicating with said opening, a cup in the casting provided with a valve opening and an apertured bar below the same, a valve in said opening provided with a stem extending through the apertured bar and into the said passage, a spring surrounding the valve stem and bearing against said bar and valve to hold the latter seated, a tube secured in the casting above the cup, and a piston arranged to be reciprocated in the tube and cup for the purpose set forth.

In testimony whereof I affix my signature, in the presence of two witnesses.

JULIUS RUMPEL.

Witnesses:
R. W. CORMAN,
JAS. W. MURDOCK.